(12) United States Patent
Kenyon

(10) Patent No.: US 6,199,065 B1
(45) Date of Patent: Mar. 6, 2001

(54) ONLINE INFORMATION DELIVERY SYSTEM INCLUDING REPLICATED SITES FROM WHICH INFORMATION CAN BE DELIVERED

(75) Inventor: Simon Charles Kenyon, Dublin (IE)

(73) Assignee: International Computers Limited, London (GB)

( * ) Notice: Subject to any disclaimer, the term of this patent is extended or adjusted under 35 U.S.C. 154(b) by 0 days.

(21) Appl. No.: 09/079,118

(22) Filed: May 14, 1998

(30) Foreign Application Priority Data

May 14, 1997 (GB) .................................................. 9709667

(51) Int. Cl.$^7$ .................................................. G06F 17/30
(52) U.S. Cl. .......................... 707/10; 707/9; 707/201; 707/202; 709/201; 709/225; 709/227
(58) Field of Search .................... 707/10, 9, 201, 707/202; 345/329; 713/151; 709/201, 225, 227

(56) References Cited

U.S. PATENT DOCUMENTS

| | | | |
|---|---|---|---|
| 5,241,594 | * | 8/1993 | Kung .......................................... 380/4 |
| 5,408,649 | * | 4/1995 | Beshears ............................... 395/575 |
| 5,596,720 | | 1/1997 | Hamada .......................... 395/200.03 |
| 5,778,367 | * | 7/1998 | Wesinger, Jr. et al. ................ 707/10 |
| 5,864,676 | * | 1/1999 | Beer et al. ........................ 395/200.59 |
| 5,898,839 | * | 4/1999 | Berteau ............................ 395/200.57 |
| 5,945,989 | * | 8/1999 | Freishtat et al. ...................... 345/329 |
| 5,974,566 | * | 10/1999 | Ault et al. ............................... 714/15 |

FOREIGN PATENT DOCUMENTS 0 359 471   3/1990  (EP) .

* cited by examiner

Primary Examiner—John Breene
Assistant Examiner—Cheryl Lewis
(74) Attorney, Agent, or Firm—Lee, Mann, Smith, McWilliams, Sweeney & Ohlson

(57) ABSTRACT

Information stored at a site remote from a user (1) is accessible by the user via a communications network (4), such as the Internet or an Intranet. In order to provide a degree of fault tolerance, the site is constituted by a number of similar sub-sites (5a, 6a, 7a, 8a, 9a; 5b, 6b, 7b, 8b, 9b etc), which each have the same network address as far as the user is concerned. A user, who requests the supply of particular information as part of a URL (Uniform Resource Locator), is initially connected to one sub-site having a respective server (8a; 8b; 8c) and a login procedure executed by a daemon process (7a; 7b: 7c). In the event of certain faults in the one sub-site the user is connected to a second sub-site without any requirement to repeat the login procedure, as a result of all sub-sites being provided with all user login details, which are stored by session daemons 9a, 9b, 9c, and the original request is complied with at the second sub-site.

10 Claims, 2 Drawing Sheets

ONLINE INFORMATION DELIVERY SYSTEM INCLUDING REPLICATED SITES FROM WHICH INFORMATION CAN BE DELIVERED

BACKGROUND OF THE INVENTION

This invention relates to information delivery systems and methods and in particular to online delivery systems and methods, such as are used for delivering information over the World Wide Web (WWW) and which are to some degree fault tolerant so that information can still be made available despite a number of machines/processes being inoperable. The latter is a particular concern of the financial services industry.

SUMMARY OF THE INVENTION

According to one aspect of the present invention there is provided a system for delivering information from a site, including database means, over a communications network to remote users upon request, wherein the site is comprised of a plurality of sub-sites each accessible by a common network address and each including respective database means, server means, means for logging-in users and means for storing details of logged-in users, wherein each sub-site user details storage means stores details of all users logged in to the plurality of sub-sites, wherein the plurality of sub-site database means are content mirrored, and wherein the system includes means to connect a user to one of the sub-sites and, upon failure of a component or process of the one sub-site, to transfer a user logged-in thereat to another of the sub-sites where the respective user request is complied with without requiring the user to login, details of the user being available from the respective storage means.

According to another aspect of the present invention there is provided a method for use in delivering information from a site, including database means, over a communications network to remote users upon request, wherein the site is comprised of a plurality of sub-sites each accessible by a common network address and each including respective database means, the plurality of sub-site database means being content mirrored including the steps of (a) upon a user request for information, connecting the user to one said sub-site, logging in the user thereat, and passing details of the logged in user to all said sub-sites for storage thereat (b) upon component or process failure at a said sub-site to which a user is logged in, connecting the logged in user to another said sub-site and complying with the user request thereat without requiring the user to login at the other said sub-site, details of the user being obtained from the details stored at the other said sub-site.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
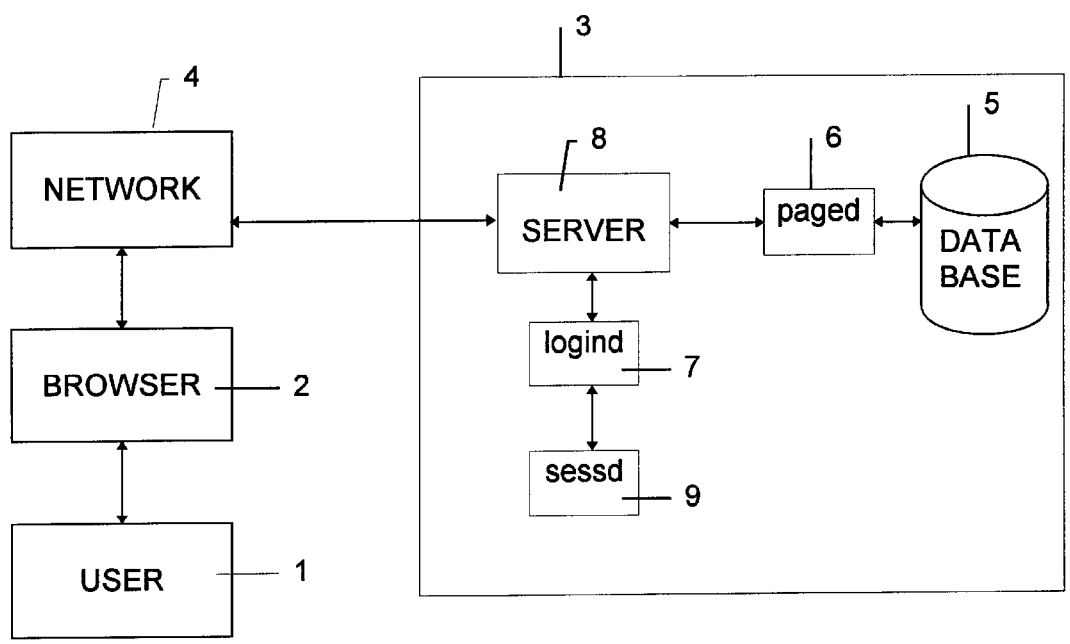
FIG. 1 illustrates, schematically, a basic known information delivery system.

In an example of information delivery system with which the present invention is concerned, and which is illustrated schematically in FIG. 1, a user 1 employs a Web network access software application 2 (browser), such as Netscape Navigator, to contact a particular Web site 3 via a network 4 which may be the Internet, an Intranet or similar. Information is freely available from many Web sites and those sites do not necessarily maintain any records as to the details of users. However, there are some sites, for example relating to the publishing of material online or the financial services industry, that provide information in a controlled way. In view of inbuilt access control systems, users only have access to information they are entitled to see, as a result, for example, of subscription or other previously arranged payment arrangements, and thus such sites can and do retain details of their users.

The Web site 3 illustrated in FIG. 1 employs an access control system which requires a user to login. The information held at this web site is stored as objects in an object database 5, such as ODB-II. When particular information is required by the user a respective page containing it is generated on the fly (on demand/dynamically) from the information stored in the database 5 and placed in a dynamically generated stream of HTML by a page daemon "paged" 6, provided the user has previously been authenticated by a login process performed by a login daemon "logind" 7. Typically a user is requested to supply a username and password to logind 7. In a particular system, which insists that all services are provided as part of a session, when the user has been authenticated he is given a session key, which is valid for a predetermined time, comprising, for example, a function of the name of the user, his password and a random number. This session key is encoded into the URL (Uniform Resource Locator) of the page concerned, so that the URL contains information about who the user is. All requests to the system must include a session key and an instruction. If a session key is found to be invalid, for example due to timeout or logout, as a result of the system checking invalidity at intervals, the user is requested to login again using a new session key. The original instruction will still be valid and is carried out as soon as the user is reauthenticated. An initial or home page is generally provided first and subsequently other content (pages) is served by a page daemon in response to user requests.

Each of the system daemons supports a set of command sequences (through its methods) and may also pass on commands (again through method calls) to objects outside of the daemon itself. The command sequences to daemons may be in the following format:

[type: class:] method/hashToken/OID/otherParams type: The type of the method (instance or class) to be invoked.

class: The name of the class on which the method is to be invoked.

(The first two parameters are optional, and are used for methods not directly supported by a daemon process itself, hence they are indicated in brackets).

method: This is the system function being invoked. It might be a request to display a particular page, execute a search, or create a new user.

hashToken: An encrypted token identifying the user sessions.

OID: A unique identifier for the object to execute the method (not required for daemon or class level methods) eg the object ID of the target database object.

otherParams: a string containing any parameters specific to method.

As well as the daemons "paged" and "logind", there is a session daemon "sessd" 9 which is responsible for updates to the session information.

It is possible to invoke executable programs on a Web server, such as 8, from Web browsers and view the resultant output through a mechanism known as a Common Gateway Interface (CGI). Executables and parameters are specified in a URL and can thus be embedded in Web pages, to be viewed by the user, as Hypertext Links to other pages. The purpose of the CGI script is to provide HTML to the server, which bundles it into HTTP packets and transmits it back to the browser, just as if it had read HTML from a flat HTML page. Hence whilst pages are generated on the fly they appears as if they were pre-existing.

The URLs basically consist of three components, which are the protocol used for communication, the machine (server) to be communicated with, or rather its IP (Internet Protocol) address, and the information file that is required, and are written in the form, for example, http://machine/file. In view of the login and session requirements referred to above, the system controls what users there are and is aware of what each user is doing. However, the user is tied to a particular machine. Hence if that machine fails, the user cannot obtain any information and for financial applications that is a particularly undesirable state of affairs. Thus rather than service being provided by a single machine, ie information is provided via a single Web server, it would be preferable if more than one machine were able to provide the same service.

As will be appreciated from the above, there are a number of programs/processes which are disposed behind the Web server 8. The daemon 6 performs the mapping from the database 5 to the format the Web server 8 understands and sends to the browser 2. The login daemon 7 attends to logging in and the generation of the session key, before passing a user off to the page daemon, which then performs the transaction or provides the information as required. It is possible to arrange that a page daemon can request the login daemon to reroute user requests to other page daemons on a different machine. This can be done automatically if the page daemon dies, or if the load on the current page daemon becomes too high. Such an arrangement is of no assistance if the login daemon fails, as it is only the login daemon that is aware of the user who has logged in.

Figure 2:
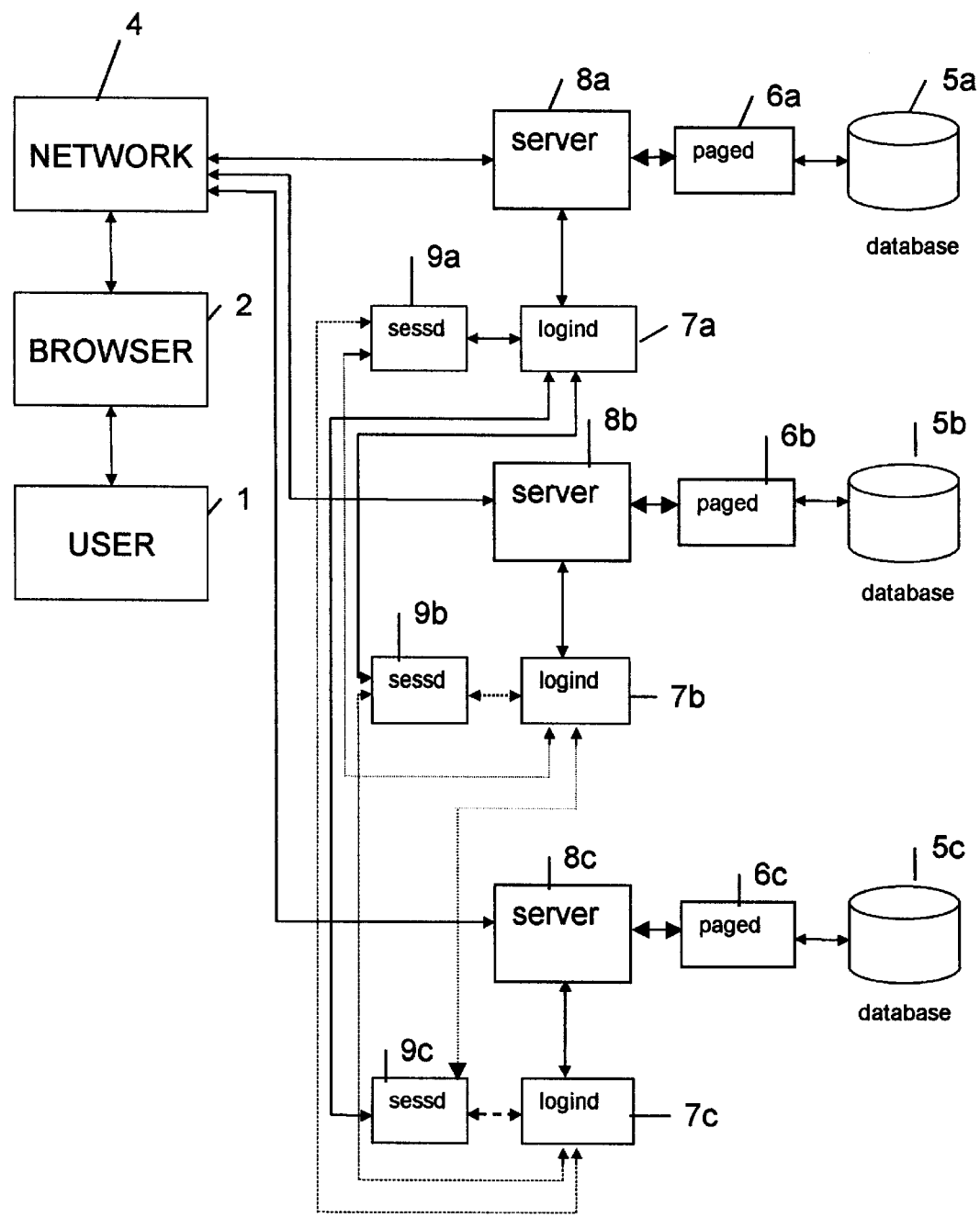
FIG. 2 illustrates, also schematically, an embodiment of information delivery system according to the present invention.

Hence the replicated arrangement of FIG. 2 is proposed, where a single site is shown as effectively comprising three sites (sub-sites) together and has three servers 8a, 8b, 8c, three login daemons 7a, 7b, 7c, three page daemons 6a, 6b, 6c, three databases 5a, 5b, 5c and three session daemons 9a, 9b, 9c. Whilst three machines are illustrated this is not the only possibility. The number employed should be consistent with the number required to make the overall system sufficiently resilient for a particular application. As will be appreciated from FIG. 2, each session daemon 9a, b, c is in communication with all three, as illustrated, of the login daemons 7a, b, c. Content mirroring is employed to ensure that the databases 5a, b, c all contain the same data and that the three sites are thus synchronised. Irrespective of which login daemon performs the login process, the session daemons of all three sites are advised the identity of the user of a session which has just been established, as a result of that information being broadcast to all of the session daemons 9a, b, c. Hence if a login daemon fails, such as 7a, a user can be logged in again by say login daemon 7b, since the associated session daemon 9b will be aware of the identity of the user concerned. Similarly, if a page daemon fails, another page daemon can be brought into action, albeit in a different one of the three sites.

Since to the user there is only one site with which contact is to be made, and therefore only one IP address ("machine" of the URL as referred to above), whereas there are actually a plurality of sites (sub-sites) in the proposed replicated system, it is necessary to arrange that the same IP address can reach more than one site. Now, the IP address is actually a number which consists of four separate numbers, each somewhere in the range 000–256, separated by dots, and is referred to as a dotted quad, for example x.y.z.w. Since numbers are not particularly easy to remember, a domain name for a "machine" can alternatively be used. A domain name is a name which maps onto the IP number, this being achieved by a system such as the DNS (Domain Name Service) on the Internet. Hence the server with the IP number x.y.z.w. can also be referred to by the name www.icl.u, for example Similar mappings between "machine" numbers and names can be achieved in private networks.

The DNS mappings between name and number are only valid for a predetermined length of time and a web browser can only use a particular mapping while it is still valid. When it times out, the browser has to request the mapping again and generally it will not have changed, mappings typically being valid for say 3 hours. This is known as the time to live (TTL). Now, the DNS does have mechanisms whereby multiple IP addresses are possible ie www.icl.u may map to x.y.z.1, x.y.z.2, x.y.z.3, ie three separate servers at a particular site, and the DNS can randomly choose which server a browser is connected to when it first logs in. Hence with regard to FIG. 2, the site including server 8b may be chosen in the first instance. If something within that site fails then the user can be connected to another of the sites, since the session daemons all know the details of the user. However, in this case, with the multiple address facility it will be necessary to wait until the server to which the user was first connected times out. If the TTL is as long as is generally set, eg 3 hours, this is impractical. However, if the TTL is reduced to something sufficiently short, eg 30, 60, 90 seconds, then eventually the initially connected server will time out and the DNS will select a different one, say server 8c, which upon checking with its associated session daemon 9c to determine the user associated with the session key, will be able to continue with the requirements of that particular user since it already has his details.

Such a system is not fault tolerant, but it is tolerant to single points of failure. It is the domain name owner that determines which IP numbers correspond to a particular name, ie provides the mapping between them, and the domain name owner can define the TTL as appropriate for the type of transactions eg information retrieval, being performed. As to setting of the TTL, there is clearly a trade-off between the overall transaction time involved when users are being transferred between machines when there are no failures but the TTL expires, ie the desired operational characteristics of the system when there are no failures and the time they have to wait for reconnection when there is a failure. If the TTL is too long then a user will potentially have to wait a long time before they can continue a transaction.

As will be appreciated from the above, there is thus provided a system and method whereby a user can be connected to a different sub-site in the event of certain problems within a particular sub-site without the need for renewed login. Since the URL is itself unchanged, once the user has been connected to another sub-site, the file required, which is part of the URL, will be supplied without the user having to request it again. Whilst the invention has been particularly described in connection with object databases for data storage and creating pages on the fly in response to user requests, it is not to be considered as so restricted. The basic principle of replication of the site, to create similar sub-sites, is applicable to other data storage systems.

What is claimed is:

1. A system for delivering information from a first site over a communications network and to remote users in response to requests from the remote users, the first site including database means in which said information to be delivered to the remote users is stored, wherein the first site is comprised by a plurality of sub-sites each accessible by a common network address, wherein each sub-site includes a respective database means, a respective server means, a respective means for logging-in users, and a respective means for storing details of logged-in users, wherein the plurality of sub-sites are interconnected and each sub-site means for storing details of logged-in users stores details of all users logged in to the plurality of sub-sites at any particular point in time, wherein the database means of the plurality of sub-sites are content mirrored whereby they each store the same information for delivery to the remote users upon request, and wherein the system includes means to select a first said sub-site for a user to login to, to connect said user to the first said sub-site, to comply with a user request for information by supplying information from the respective database means and, upon failure of a component or process of the first said sub-site, to transfer said user logged-in at the first said sub-site to a second said sub-site where the respective user request is complied with, by supplying information from the respective database means, without requiring said user to log-in at the second said sub-site, details of said user being available from the means for storing details of all logged-in users included at the second said sub-site.

2. A system as claimed in claim 1, wherein the sub-site database means are each comprised by a respective object database and wherein each sub-site includes means for generating a page of information, dynamically, in response to a said user request, from the content of the respective object database.

3. A system as claimed in claim 1, wherein the subsite logging-in means are each comprised by a respective login daemon.

4. A system as claimed in claim 3, wherein the means for storing details of logged-in users at each sub-site is comprised by a respective session daemon, and wherein each session daemon is in communication with all of the login daemons whereby each session daemon stores details of all users logged in to the plurality of sub-sites.

5. A system as claimed in claim 1, wherein a user request is made by means of a network access software application and using a Uniform Resource Locator (URL) including a domain name for the common network address, and wherein the system includes a domain name service (DNS) capable of mapping the domain name into multiple addresses, each of the multiple addresses corresponding to a respective one of the sub-sites, and selecting the addresses corresponding to one said sub-site for user to be connected to.

6. A system as claimed in claim 5, wherein the mapping of the domain name into the address corresponding to the one said sub-site is valid for a predetermined time, wherein at the expiry of the predetermined time the network access software application requests the mapping again whereby a different sub-site can be connected to, and wherein the predetermined time is set to a length consistent with reconnection upon a sub-site component or process failure and consistent with desired operational characteristics of the system when there is no sub-site component or process failure.

7. A method for use in delivering information from a first site over a communications network and to remote users in response to requests from the remote users, the first site including database means in which said information to be delivered to the remote users is stored, wherein the first site is comprised by a plurality of sub-sites each accessible by a common network address, wherein each sub-site includes a respective database means and a respective means for storing details of logged-in users, and wherein the database means of the plurality of sub-sites are content mirrored whereby they each store the same information for delivery to the remote users upon request, the method including the steps of (a) upon a user request for information, selecting a first said sub-site for the user to log in at, connecting the user to the first said sub-site, logging in the user at the first said sub-site, passing details of the logged in user to all said sub-sites for storage in the respective means for storing details of logged-in users and complying with the user request for information by supplying information from the respective database means, and (b) upon component or process failure at a said sub-site to which a user is logged in, connecting the logged in user to another said sub-site and complying with the user request thereat, by supplying information from the respective database means, without requiring the user to log in at the other said sub-site, details of the user being obtained from the details of all logged-in users stored at the other said sub-site.

8. A method as claimed in claim 7, wherein the sub-site database means are each comprised by a respective object database, and including the step of generating a page of information, dynamically, in response to a said user request, from the contents of the respective object database.

9. A method as claimed in claim 7, including the step of making a user request by means of a network access software application and using a Uniform Resource Locator (URL) including a domain name for the common network address, and including the step of using a domain name service (DNS) to map the domain name into one of a plurality of addresses, each corresponding to a respective sub-site, and to select the address corresponding to one said sub-site.

10. A method as claimed in claim 9 wherein the mapping of the domain name into the address corresponding to the one said sub-site is valid for a predetermined time and wherein at the expiry of the predetermined time the network access software application requests the mapping again whereby a different sub-site can be connected to, and including the step of setting the predetermined time to a length consistent with reconnection upon a sub-site component or process failure and consistent with desired operational characteristics of the system when there is no sub-site component or process failure.

* * * * *